(12) United States Patent
Gomez Gutierrez et al.

(10) Patent No.: US 11,314,258 B2
(45) Date of Patent: Apr. 26, 2022

(54) SAFETY SYSTEM FOR A VEHICLE

(71) Applicant: Intel Corporation, Santa Clara, CA (US)

(72) Inventors: David Gomez Gutierrez, Tlaquepaque (MX); Ranganath Krishnan, Hillsboro, OR (US); Javier Felip Leon, Hillsboro, OR (US); Nilesh Ahuja, Cupertino, CA (US); Ibrahima Ndiour, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 94 days.

(21) Appl. No.: 16/727,955

(22) Filed: Dec. 27, 2019

(65) Prior Publication Data

US 2020/0133281 A1 Apr. 30, 2020

(51) Int. Cl.
| | |
|---|---|
| *G05D 1/02* | (2020.01) |
| *B60W 50/02* | (2012.01) |
| *B60W 30/095* | (2012.01) |
| *B60W 50/00* | (2006.01) |
| *B60W 40/02* | (2006.01) |

(52) U.S. Cl.
CPC ....... *G05D 1/0214* (2013.01); *B60W 50/0225* (2013.01); *G05D 1/0221* (2013.01); *B60W 30/0956* (2013.01); *B60W 40/02* (2013.01); *B60W 2050/0005* (2013.01)

(58) Field of Classification Search
CPC ......... B60W 50/0225; B60W 30/0956; B60W 2050/0005; B60W 40/02; B60W 2554/402; B60W 2556/20; B60W 2720/10; B60W 2754/30; B60W 2050/0028; B60W 60/0018; G05D 1/0214; G05D 1/0221
See application file for complete search history.

(56) References Cited

U.S. PATENT DOCUMENTS

| | | | | |
|---|---|---|---|---|
| 9,645,576 | B2* | 5/2017 | Frangou | B60W 30/16 |
| 10,042,359 | B1* | 8/2018 | Konrardy | B60R 25/10 |
| 2016/0046290 | A1* | 2/2016 | Aharony | B60W 10/20 |
| | | | | 701/41 |
| 2017/0132334 | A1* | 5/2017 | Levinson | G06F 30/20 |

(Continued)

OTHER PUBLICATIONS

Felip, J. et al.: "Real-Time Approximate Bayesian Computation for Scene Understanding"; retrived from arXiv:1905.13307v1 [cs.CV] on May 22, 2019; 15 pages.

(Continued)

*Primary Examiner* — Jeff A Burke
*Assistant Examiner* — Kyle T Johnson
(74) *Attorney, Agent, or Firm* — Viering, Jentschura & Partner MBB

(57) ABSTRACT

A safety system for a vehicle may include one or more processors configured to determine uncertainty data indicating uncertainty in one or more predictions from a driving model during operation of a vehicle; change or update one or more of the driving model parameters to one or more changed or updated driving model parameters based on the determined uncertainty data; and provide the one or more changed or updated driving model parameters to a control system of the vehicle for controlling the vehicle to operate in accordance with the driving model including the one or more changed or updated driving model parameters.

19 Claims, 10 Drawing Sheets

(56) References Cited

U.S. PATENT DOCUMENTS

| | | | |
|---|---|---|---|
| 2018/0148047 A1* | 5/2018 | Kadetotad | B60W 10/20 |
| 2018/0173240 A1* | 6/2018 | Fang | G05D 1/0289 |
| 2019/0047559 A1* | 2/2019 | Conde | H04W 4/38 |
| 2019/0049968 A1* | 2/2019 | Dean | G05D 1/0088 |
| 2019/0180502 A1* | 6/2019 | Englard | G01S 7/40 |
| 2019/0251371 A1* | 8/2019 | Diedrich | G06F 3/0484 |
| 2019/0265714 A1* | 8/2019 | Ball | G06N 5/046 |
| 2019/0369626 A1* | 12/2019 | Lui | G06F 30/20 |
| 2019/0377354 A1 | 12/2019 | Shalev-Shwartz et al. | |
| 2020/0089246 A1* | 3/2020 | McGill, Jr. | G06N 3/08 |
| 2020/0133281 A1* | 4/2020 | Gomez Gutierrez | G05D 1/0214 |
| 2020/0226430 A1* | 7/2020 | Ahuja | B60W 60/0016 |
| 2021/0080955 A1* | 3/2021 | Wilkinson | G05D 1/0214 |
| 2021/0097401 A1* | 4/2021 | Ramalho | G06N 7/005 |

OTHER PUBLICATIONS

Amirian, J. et al.: "Social Ways: Learning Multi-Modal Distributions of Pedestrian Trajectories with GANs"; retrived from arXiv:1904.09507v2 [cs.CV] on Apr. 24, 2019; 9 pages.

Shalev-Shwartz, S. et al.: "On a Formal Model of Safe and Scalable Self-driving Cars"; 2017; retrived from arXiv:1708.06374v6 [cs.RO] on Oct. 27, 2018; 37 pages.

Kendall, A. et al.: "What Uncertainties Do We Need in Bayesian Deep Learning for Computer Vision?"; 31st Conference on Neural Information Processing Systems; 2017; 11 pages Long Beach, CA, USA.

\* cited by examiner

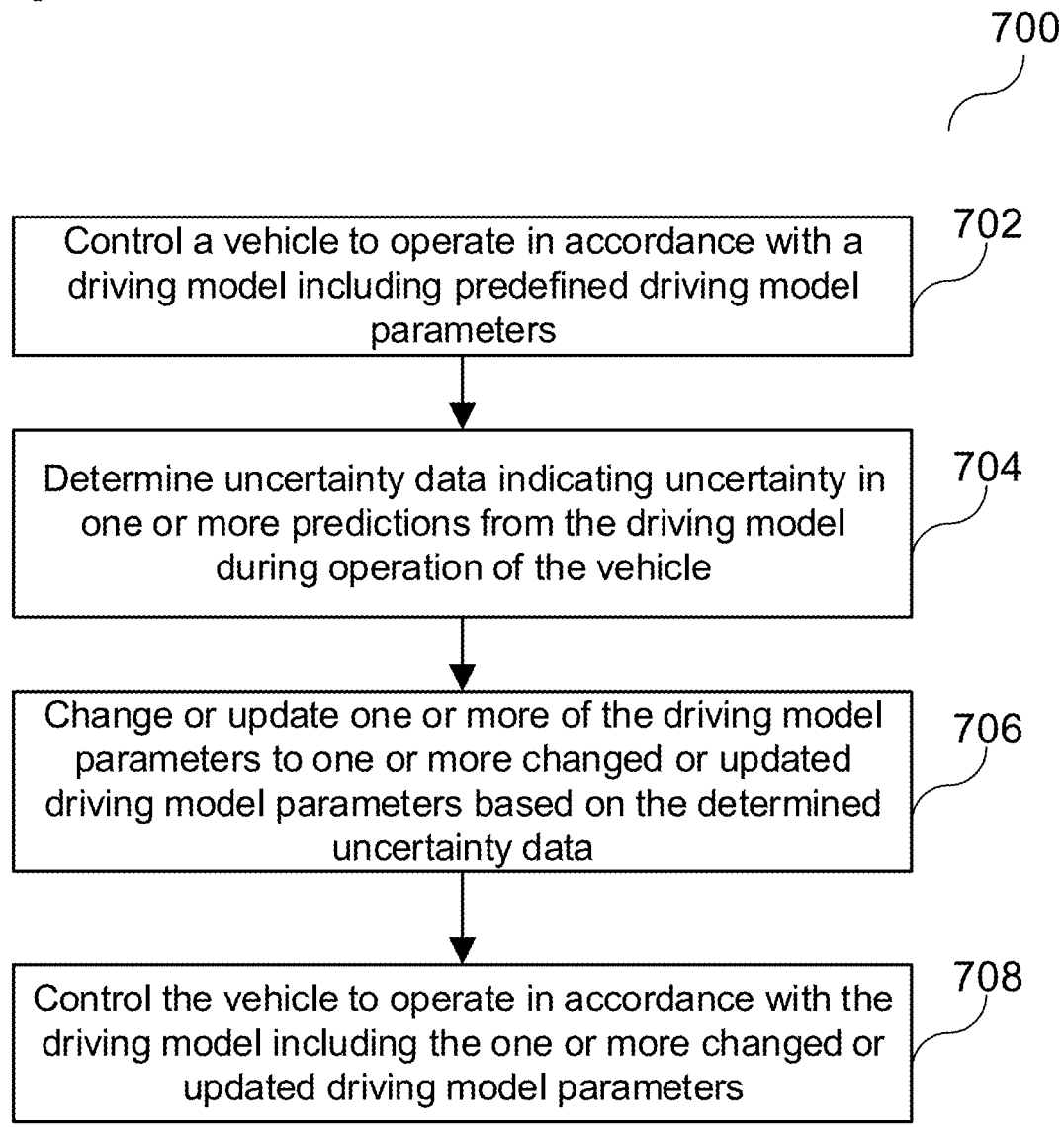

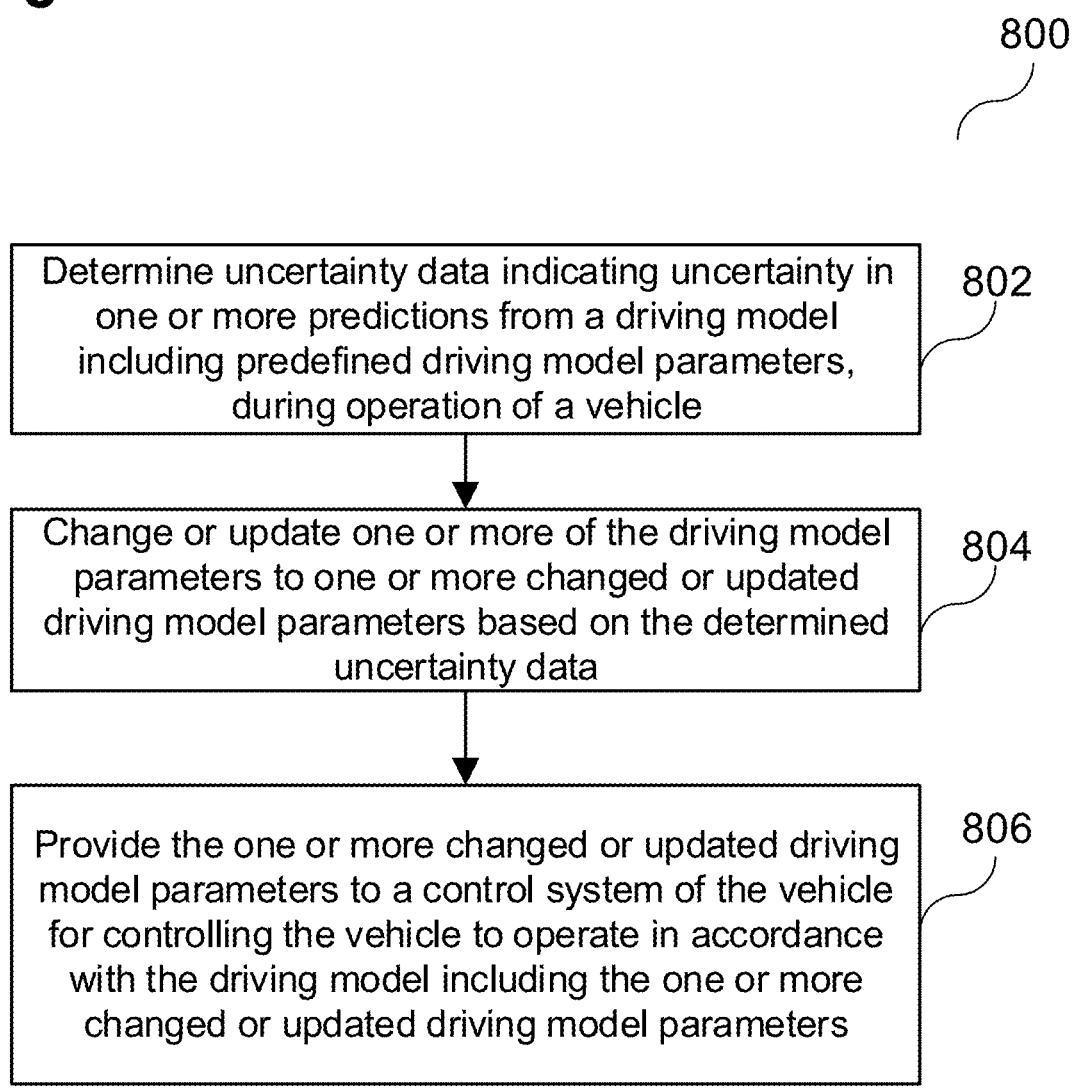

SAFETY SYSTEM FOR A VEHICLE

TECHNICAL FIELD

Various aspects of this disclosure generally relate to a safety system for a vehicle.

BACKGROUND

Autonomous Driving (AD) requires reliable safety systems that process detected data of the environment of an autonomous vehicle (AV) to implement a driving policy of the AV. AVs may need to navigate under different scenarios and weather conditions. However, rain, fog, snow, frost, dust, etc., or even aging of sensors installed in an AV, may degrade a perception/classification system of the AV, which may influence predictions of the perception/classification system.

SUMMARY

A safety system for a vehicle may include one or more processors. The one or more processors may be configured to determine uncertainty data indicating uncertainty in one or more predictions from a driving model including predefined driving model parameters, during operation of a vehicle, to change or update one or more of the driving model parameters to one or more changed or updated driving model parameters based on the determined uncertainty data, and to provide the one or more changed or updated driving model parameters to a control system of the vehicle for controlling the vehicle to operate in accordance with the driving model including the one or more changed or updated driving model parameters.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows a method of operating a safety system for a vehicle in accordance with various aspects of this disclosure; and FIG. 8 shows a method of operating a safety system for a vehicle in accordance with various aspects of this disclosure.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Definitions

The term "object" is to be understood to refer to immobile objects including, for example, buildings, trees, roads, traffic signs or lights, as well as moving objects including, for example, vehicles, pedestrians, animals.

The term "road user" is to be understood as any participant in traffic and may include pedestrians, cyclists, motorcyclists, motorists, scooterists, wheelchair users.

A "vehicle" is to be understood as any type of driving object and may include automobiles, busses, mini busses, vans, trucks, mobile homes, vehicle trailers, motorcycles, bicycles, tricycles, moving robots, personal transporters.

A "ground vehicle" is to be understood as any type of object driving on the ground, e.g. on a street.

The term "autonomous vehicle" refers to a vehicle capable of implementing at least one navigational change without driver input. A navigational change refers to a change in one or more of steering, braking, or acceleration/deceleration of the vehicle. To be autonomous, a vehicle need not be fully automatic (for example fully operational without driver or without driver input). An autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or breaking under certain circumstances). In some aspects, autonomous vehicles may handle some or all aspects of braking, speed control, and/or a steering of the vehicle.

The term "aleatoric uncertainty", also referred to as "input uncertainty", is understood to refer to uncertainty that originates from noise inherent with observation. The cause for this type of uncertainty is noise from one or more sensors.

The term "epistemic uncertainty", also referred to as "model uncertainty", is understood to refer to uncertainty that originates from lack of knowledge in representing model parameters, specifically in the scenario of limited data.

Figure 1:
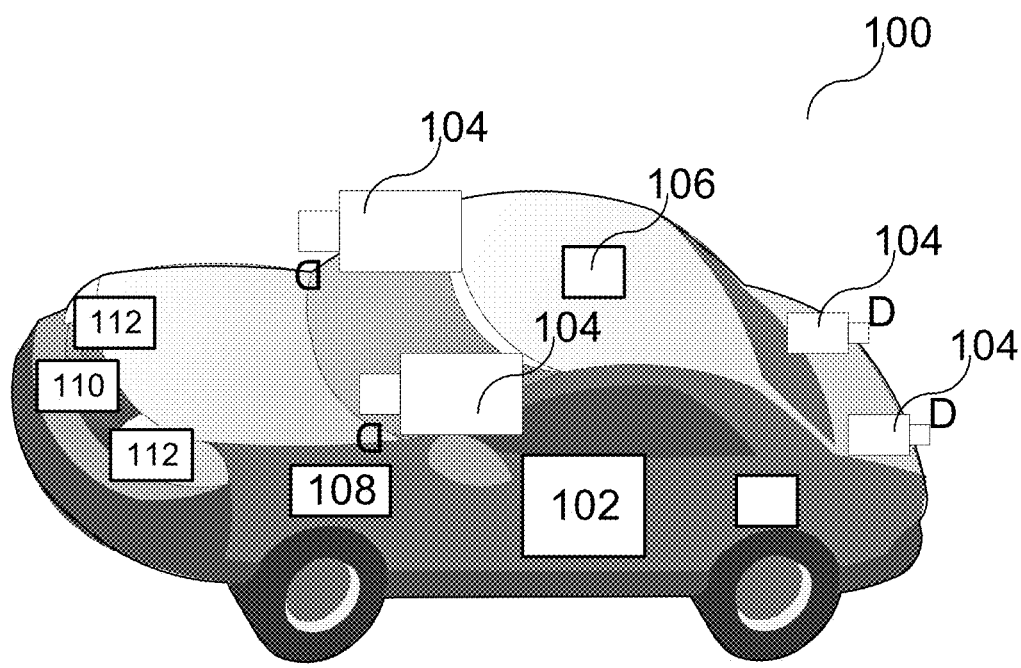
FIG. 1 shows an autonomous vehicle in accordance with various aspects of this disclosure.
Figure 2:
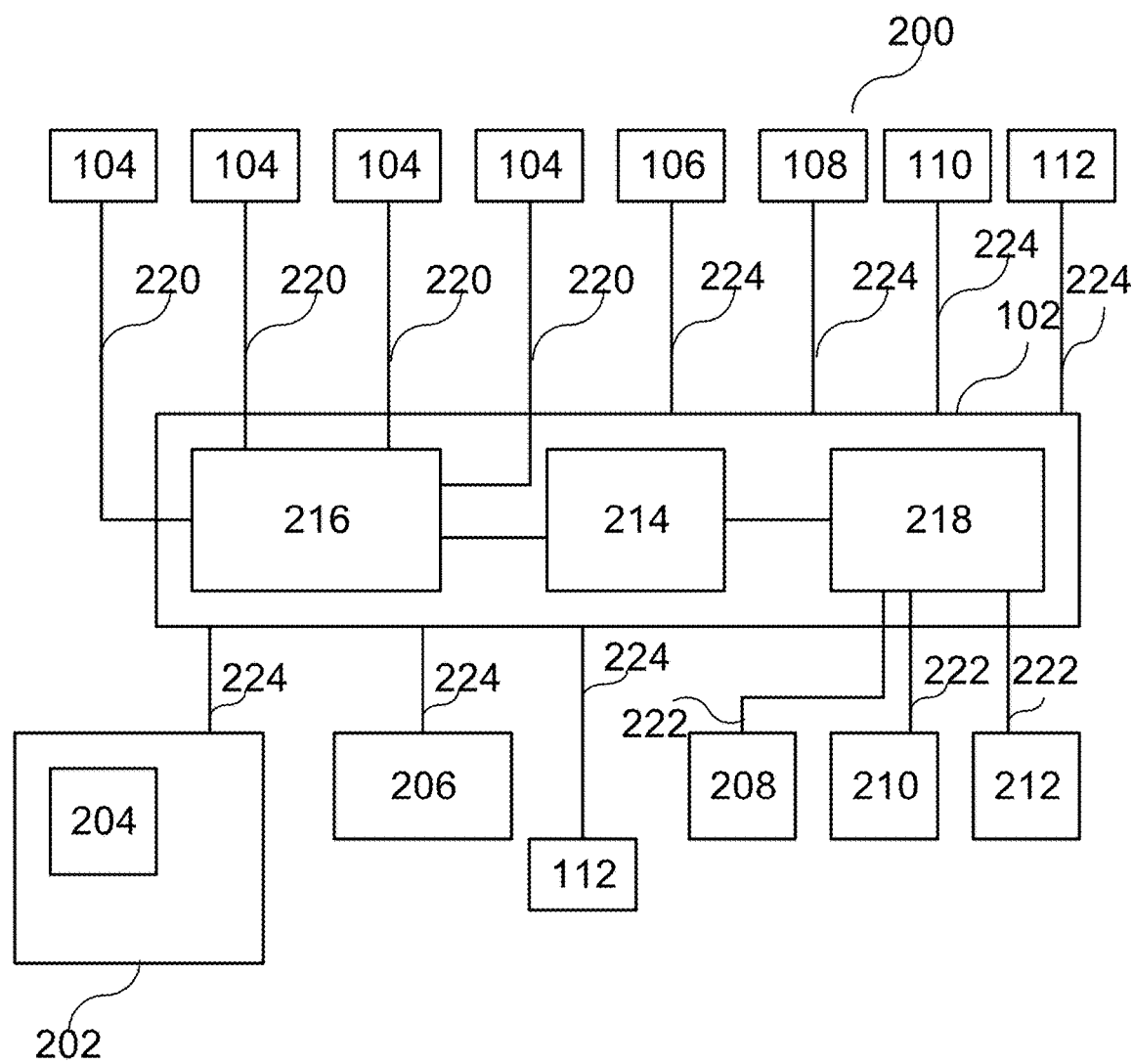
FIG. 2 shows various electronic components of a safety system of the vehicle.

FIG. 1 shows a vehicle 100 including a safety system 200 (shown in FIG. 2) in accordance with various aspects of this disclosure. The safety system 200 may include various components depending on the requirements of a particular implementation. As shown in FIG. 1 and FIG. 2, the safety system 200 may include one or more processors 102, one or more image acquisition devices 104 such as e.g. one or more cameras, a position sensor 106 such as a Global Navigation Satellite System (GNSS), e.g. a Global Positioning System (GPS), one or more memories 202, a map database 204, one or more user interfaces 206 (such as e.g. a display, a touch screen, a microphone, a loudspeaker, one or more buttons and/or switches, and the like), and one or more wireless transceivers 208, 210, 212. The wireless transceivers may be configured to different desired radio communication protocols or standards. By way of example, a first wireless transceiver 208 may be configured in accordance with a Short Range mobile radio communication standard such as e.g. Bluetooth, Zigbee, and the like. Furthermore, a second wireless transceiver 210 may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with 3GPP ($3^{rd}$ Generation Partnership Project) standards. A third wireless transceiver 212 may be configured in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more wireless transceivers 208, 210, 212 may be configured to transmit signals via an air interface. The image acquisition devices 104 may each include any type of device suitable for capturing at least one image from an environment.

The one or more processors 102 may include an application processor 214, an image processor 216, a communication processor 218, or any other suitable processing device. Similarly, image acquisition devices 104 may include any number of image acquisition devices and components depending on the requirements of a particular application. Image acquisition devices 104 may include one or more image capture devices (e.g., cameras, CCDs (charge coupling devices), or any other type of image sensor). The safety system 200 may also include a data interface communicatively connecting the one or more processors 102 to the image acquisition devices 104. For example, a first data interface may include any wired and/or wireless first link 220 or first links 220 for transmitting image data acquired by image acquisition devices 104 to the one or more processors 102, e.g. to the image processor 216.

The wireless transceivers 208, 210, 212 may be coupled to the one or more processors 102, e.g. to the communication processor 218 e.g. via a second data interface which may include any wired and/or wireless second link 222 or second links 222 for transmitting radio transmitted data acquired by wireless transceivers 208, 210, 212 to the one or more processors 102, e.g. to the communication processor 218.

The one or more memories 202 as well as the one or more user interfaces 206 may be coupled to each of the one or more processors 102 e.g. via a third data interface which may include any wired and/or wireless third link 224 or third links 224. Furthermore, the position sensor 106 may be coupled to each of the one or more processors 102 e.g. via the third data interface.

Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some embodiments, each processor 214, 216, 218 may include any type of single or multi-core processor, mobile device microcontroller, central processing unit, etc.

Any of the processors disclosed herein may be configured to perform certain functions in accordance with program instructions which may be stored in a memory of the one or more memories 202. In other words, a memory of the one or more memories 202 may store software that, when executed by the processor, controls the operation of the system, e.g. the safety system 200. A memory of the one or more memories 202 may include one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some embodiments, the safety system 200 may further include components such as a speed sensor (e.g., a speedometer) for measuring a speed of the vehicle 100. The safety system 200 may also include one or more accelerometers (either single axis or multiaxis) (not shown) for measuring accelerations of the vehicle 100 along one or more axes. The safety system 200 may further include additional sensors or different sensor types such as one or more radar sensors 110, one or more LIDAR sensors 112 (which may be integrated in the head lamps of the vehicle 100), and the like. The one or more radar sensors 110 and one or more LIDAR sensors 112 may be coupled to each of the one or more processors 102 e.g. via the third data interface.

The one or more memories 202 may store data, e.g. in a database or in any different format, that e.g. indicate a location of known landmarks. Sensory information (such as images, radar signal, depth information from LIDAR or stereo processing of two or more images) of the environment of the vehicle 100 may be processed together with position information, such as a GPS coordinate, vehicle's ego motion, etc. to determine a current location of the vehicle 100 relative to the known landmarks, and refine the vehicle location. Certain aspects of this technology may be included in a localization technology such as a mapping and routing model.

The map database 204 may include any type of database for storing (digital) map data for the vehicle 100, e.g. for the safety system. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such embodiments, a processor may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be used to determine or update a known position of the vehicle 100 with respect to a target trajectory. The landmark representations may include data fields such as landmark type, landmark location, among other potential identifiers.

Furthermore, the safety system may include a driving model, e.g. an advanced driving assistance system (ADAS). By way of example, the safety system may include (e.g. as part of the driving model) a computer implementation of a safety driving model, which may be a rigorous mathematical model formalizing an interpretation of the law which is applicable to self-driving (ground) vehicles. A safety driving model may be designed to achieve three goals: first, the interpretation of the law should be sound in the sense that it complies with how humans interpret the law. Second, the interpretation should lead to a useful driving policy, meaning it will lead to an agile driving policy rather than an overly-defensive driving which inevitably would confuse other human drivers and will block traffic and in turn limit the scalability of system deployment. Third, the interpretation should be efficiently verifiable in the sense that it can be rigorously proven that the self-driving (autonomous) vehicle implements correctly the interpretation of the law. A safety driving model illustratively may be or include a mathematical model for safety assurance that enables to identify and perform proper responses to dangerous situations such that self-perpetrated accidents can be avoided.

A safety driving model may be constructed by formalizing the following five rules:

Do not hit someone from behind.
Do not cut-in recklessly.
Right-of-way is given, not taken.
Be careful of areas with limited visibility.
If you can avoid an accident without causing another one, you must do it.

As described above, the vehicle 100 may include the safety system 200 as also described with reference to FIG. 2.

The one or more processors 102 may be included in the vehicle 100, e.g. integrated with or separate from an engine control unit (ECU) of the vehicle 100.

The safety system may in general generate data to control or assist to control the ECU and/or other components of the vehicle 100 to directly or indirectly control the driving of the vehicle 100.

Adaptive Safety Factor in Safety Model Through Uncertainty Estimation

Autonomous vehicles (AV) may need to navigate under different scenarios and weather conditions. However, rain, fog, snow, frost, dust, etc., or even aging of the sensors, may degrade an AV's perception/classification system. An AV navigating during the night or under such weather conditions may detect and classify objects such as pedestrians and cyclists at a closer distance correctly, but may make errors in the classification of objects at farther distance. In turn, for safe navigation, the uncertainty due to less-than-ideal perception conditions should be considered in determining the safe speed of the vehicle, since the response time may be reduced.

So far, safety driving models have not taken into account the degradation of the perception/classification system, due to aging or environmental conditions. According to an aspect of this disclosure, a system is proposed that constantly monitors uncertainty associated with predictions and incorporates it into a safety driving model.

A safety driving model may be or include a mathematical model for safety assurance in traffic scenarios, which provides a method for calculating proper responses of an autonomous vehicle (under ideal detection/classification conditions). It may first compute a safe longitudinal distance according to a speed of a road user, e.g. a pedestrian. Then, it may determine the vehicle's kinematic state such that if a proper response is applied the vehicle remains at a safe distance. However, a safety driving model may trigger a proper response only after the road user (e.g., pedestrian) is correctly detected and classified.

Conventional safety driving models do not consider variations in the detection/classification system due to different environmental conditions. Although environmental conditions may not significantly affect the detection of other vehicles, they may significantly impact the detection and classification of pedestrians and cyclists, which may be mainly based on vision.

As an example, assume that a perception/classification system of an autonomous vehicle (AV) detects pedestrians at 15 m distance under ideal conditions and that the kinematic state of the vehicle is such that it allows the vehicle to safely stop at such distance. An accident may occur under fog if the AV's perception/classification system detects pedestrians only until the vehicle is at a 7 m distance. Thus, the kinematic state of the vehicle (under fog) should be such that the vehicle can apply a safe brake at a 7 m distance. For example, the maximum allowed velocity for the vehicle under fog should be lower than under ideal conditions.

Figure 3:
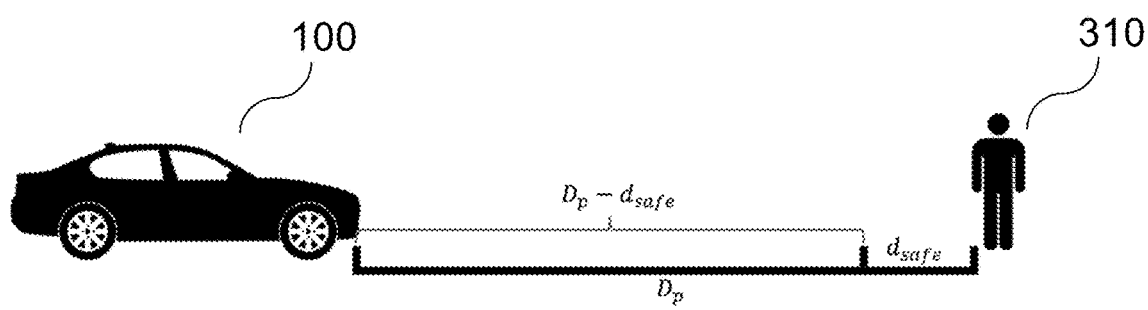
FIG. 3 shows a diagram illustrating a detection distance and a safety distance.

To illustrate how changes in the perception/classification system should affect the allowed velocities for an autonomous vehicle, e.g. vehicle 100 of FIG. 1, and with reference to FIG. 3, consider vehicle 100 driving in a residential area and assume that, according to the current situation, a perception/classification system of the vehicle 100 detects a road user 310 (e.g. pedestrian, cyclist) at a distance $D_p$ from the vehicle 100. Moreover, assume a response time from detection to action of $t_r$. Thus, the maximum allowed velocity $v_{max}$ such that the vehicle 100 stops at a distance of at least $d_{safe}$ from the road user 310, if the vehicle 100's perception/classification system detects the road user 310 at a time $t_c$ at the distance $D_p$ from the vehicle 100, which travels at a velocity v at the time $t_c$ and applies a breaking of at least $a_{min,break}$ at a time $t_c+t_r$, can be derived as follows.

Applying the equations of motion yields:

The distance the vehicle 100 travels in the time interval $[t_c, t_c+t_r]$ is $$d_{[t_c, t_c+t_r]} = v t_r \tag{1}$$

and the distance the vehicle 100 travels from $t_c+t_r$ to a full stop, which occurs at $t_s$, is given by $$d_{[t_c+t_r, t_s]} = \frac{v^2}{2 a_{min,break}} \tag{2}$$

Thus, the distance the vehicle 100 travels from detection at time $t_c$ until full stop at time $t_s$ is given by $$d_{[t_c, t_s]} = t_r v + \frac{v^2}{2 a_{min,break}} \tag{3}$$

Thus, the maximum allowed velocity $v_{max}$ to ensure that the vehicle 100 will stop at a distance of at least $d_{safe}$ from the road user 310, if the vehicle 100's perception/classification system detects the road user 310 at the distance $D_p$ from the vehicle 100, is given by $v_{max}=\max(v)$, such that $$t_r v + \frac{v^2}{2 a_{min,break}} \leq D_p - d_{safe} \tag{4}$$

Thus, such $v_{max}$ affects the definition of a safe longitudinal distance in a safety driving model, for example the definition of a minimal safe longitudinal distance between two vehicles (front vehicle and rear vehicle) driving at the same direction (one behind the other) along a single lane road, which, may be given by $$d_{min} = \left[ v_r \rho + \frac{1}{2} a_{max,acc} \rho^2 + \frac{(v_r + a_{max,acc}\rho)^2}{2a_{min,br}} - \frac{v_f^2}{2a_{max,br}} \right]_+ \quad (5)$$

where $[x]_+ := \max \{x, 0\}$
and where
  $v_r$ is the velocity of the rear vehicle when the front vehicle starts braking
  $\rho$ is the response time of the rear vehicle (i.e. the time between the time the front vehicle starts braking and the time the rear vehicle starts braking)
  $a_{max,acc}$ is the maximum acceleration of the rear vehicle during the response time
  $a_{min,br}$ is the minimum deceleration of the rear vehicle after the response time until a full stop
  $a_{max,br}$ is the maximum deceleration of the front vehicle after the front vehicle starts braking
  $v_f$ is the velocity of the front vehicle when the front vehicle starts braking.

An aspect of this disclosure thus is to determine a maximum allowed speed (for a vehicle) if a confident detection/classification (based on the current uncertainty estimation) of an object (e.g., pedestrian, cyclist, or other road user) is expected to occur only at a distance lower than some distance Y. Obtaining such maximum speed, allows in turn to redefine, under different scenarios, the safe longitudinal distance for the vehicle. Thus, an aspect of this disclosure is to enable a safety driving model to harness uncertainty measurements and sensor degradation for safety guarantees. By redefining the safe longitudinal distance, systems and methods in accordance with aspects of this disclosure may achieve that based on the perception/classification system's degradation a proper response (as defined by the safety driving model) of the vehicle still exists after detecting the object (e.g., road user, e.g. pedestrian or cyclist). This may contribute toward safer and more reliable autonomous vehicles, for example for pedestrians and cyclists.

Conventional methods use detection of pedestrians with systems that have been shown to provide optimistic confidence levels (in other words, they provide a high confidence value while failing to classify accurately). These methods do not take uncertainty in the perception/classification system into account to adjust the speed. Thus, conventional systems may be only safe for pedestrians under ideal conditions. For successful deployment of autonomous vehicles (AV), not only the detection systems should be improved but the uncertainty should be taken into account in determining the safe speed for navigation.

An aspect of this disclosure is to incorporate uncertainty into a safety driving model to improve the navigation around pedestrians and cyclists, which may be currently, one of the main challenges for the adoption of autonomous vehicles.

An aspect of this disclosure is to provide a method that allows to dynamically adjust parameters of a safety driving model, to consider uncertainty in the detection/classification systems and avoid overconfident actions that might increase the risk of an accident. The approach may combine different methods to determine the uncertainty in the perception/classification system. It may use probabilistic methods to assess the uncertainty while distinguishing between uncertainty due to sensor noise (aleatoric/input uncertainty) and uncertainty due to observations far from the training set (epistemic/model uncertainty). It may keep track of the detections performed to determine at what distance road users (e.g., pedestrians and cyclists) are correctly detected and classified with uncertainty within allowed bounds. It may exploit previous observations of the same area to determine the degradation of the perception, for instance, comparing the uncertainty in the classification of static objects, the number of features observed, etc. It may use the uncertainty quantification to adjust the speed of an autonomous vehicle (AV), to allow the vehicle to safely break to avoid a collision. Thus, the uncertainty quantification may allow, for instance, to dynamically adjust the safety driving model's parameters in the definitions of safe distance and proper response.

One or more processors of a safety system, e.g. the one or more processors 102 of vehicle 100 shown in FIG. 1 including safety system 200, may implement the aforementioned and following aspects and methods. One or more memories of the safety system, e.g. the one or more memories 202 of safety system 200, may store (at least temporarily) any of the information (e.g., input or output data, model parameters, computation results, etc.) used or obtained in the methods (e.g., used or obtained in or during any of the method steps) according to aspects of this disclosure.

In the following, various aspects of a safety system for a vehicle and a method of operating a safety system for a vehicle of this disclosure will be explained in more detail with reference to FIGS. 4A and 4B, 5A to 5C, and 6.

Tracking-Based Estimation of the Distance in which Objects are Detected

According to an aspect, as the vehicle (e.g., vehicle 100) navigates, it may constantly detect and track objects such as pedestrians and cyclists as well as recording a dataset of the epistemic and aleatoric uncertainty obtained from a Bayesian neural network (BNN) at each frame. As the vehicle gets closer to an object (e.g., a road user, e.g. a pedestrian or cyclist) and correctly classifies it, the distance in which it (the object) was correctly classified with a required confidence may be measured. Then, such dataset may be used to train a fully connected neural network (e.g., fully connected recurrent neural network) to input the aleatoric and epistemic per pixel uncertainty and output the distance in which an object (e.g., road user, e.g. pedestrian or cyclist), would be correctly classified.

In the following, the computation of the per pixel aleatoric and epistemic uncertainties will be explained in more detail.

Uncertainty Estimation Using Bayesian Neural Network

Figure 4A:
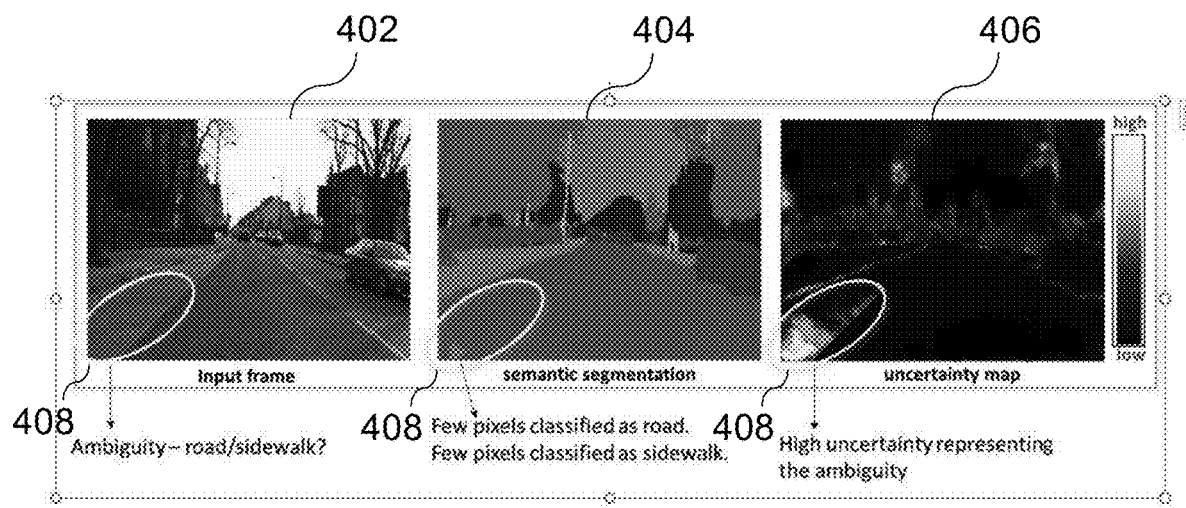
FIG. 4A to FIG. 4C show examples of semantic segmentation with uncertainty estimation.
Figure 4B:
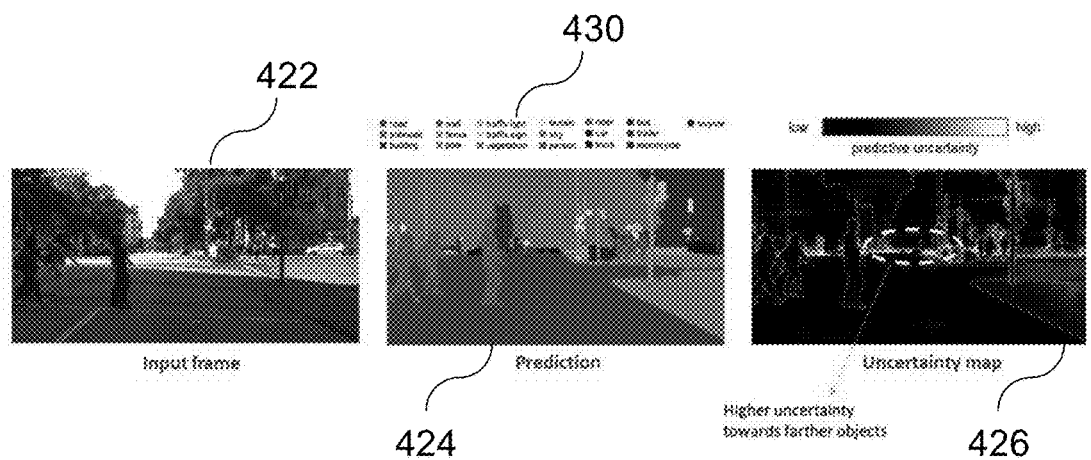
Figure 4C:
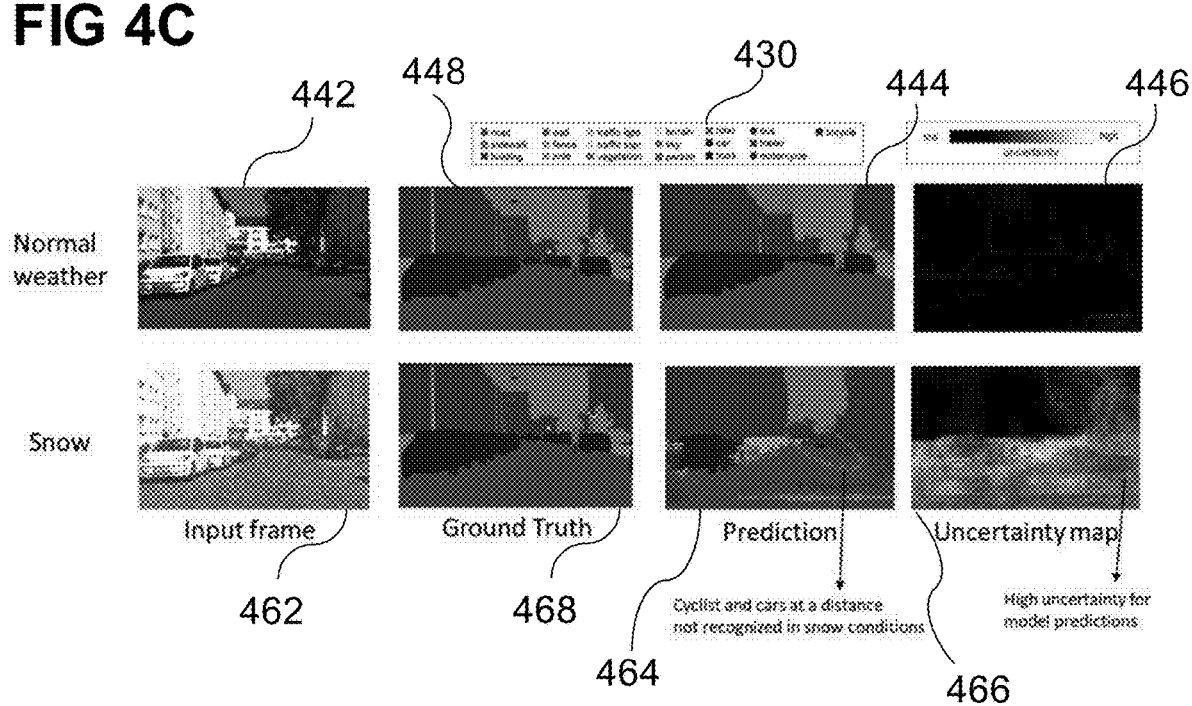

Referring to FIGS. 4A to 4C, it is illustrated with few semantic segmentation examples how uncertainty estimation using a Bayesian deep neural network can be used for adapting safety factor in a safety driving model.

Example A

FIG. 4A shows there is an inherent ambiguity in section 408 of a scene (captured as input frame 402) that is highlighted, as road or sidewalk. That is, the neural network classifies some of the pixels in section 408 of the scene as road, but classifies others of the pixels in section 408 as sidewalk, as may be seen from semantic segmentation map 404 corresponding to input frame 402. This type of data may not be observed during model training. The uncertainty estimates from the Bayesian deep neural network, represented by uncertainty map 406, may capture this ambiguity with high uncertainty estimates (in 408). When high uncertainty is observed, control systems in the autonomous vehicle that make decisions based on the visual perception system can be alerted (e.g., to reduce speed or request expert intervention (e.g., from a human driver)).

Example B

FIG. 4B shows an uncertainty map 426 obtained by the Bayesian deep neural network representing higher uncertainty for farther objects in a scene (captured as input frame 422) under normal weather conditions. Semantic segmentation map 424 shows classification of objects in the input frame 422 into various classes 430 ("road", "wall", "traffig light", . . . , "truck", "motorcycle") by the neural network. As may be seen from uncertainty map 426, classification of objects farther away is associated with higher uncertainty while classification of near objects (e.g., pedestrians in input frame 422) is associated with low uncertainty.

Example C

FIG. 4C shows simulated snow condition depicting performance degradation in prediction with distance under hazardous weather conditions, or limited visibility. Cyclist and cars that are little farther than few meters from a camera of the autonomous vehicle (AV) are not identified in the semantic segmentation map. This is flagged by high uncertainty estimates in the uncertainty map. In more detail, FIG. 4C shows a scene under normal weather conditions (captured as input frame 442) and under simulated snow condition (input frame 462), corresponding ground truth maps 448 and 468 (indicating ideal classification of all objects in input frames 442 and 462 into the classes 430; the ground truth maps 448 and 468 are identical), corresponding semantic segmentation maps 444 and 464 showing the classification of the objects in input frames 442 and 462, respectively, into the classes 430 as obtained by the neural network, and corresponding uncertainty maps 446 and 466 showing the uncertainty estimates for both conditions as obtained by the neural network. As may be seen from segmentation map 464, the neural network does not recognize the cyclist and cars at a distance farther than a few meters from the camera. This is accompanied by high uncertainty values in the corresponding uncertainty map 466.

In the aforementioned exemplary scenarios (alternatively or additionally in other scenarios), methods and systems in accordance with various aspects of this disclosure can use uncertainty estimates to dynamically adjust the safety driving model's parameters in the definitions of safe distance and proper response (e.g. adjust the speed of the AV, to allow the vehicle to slow down or safely break to avoid a collision.)

Figure 5A:
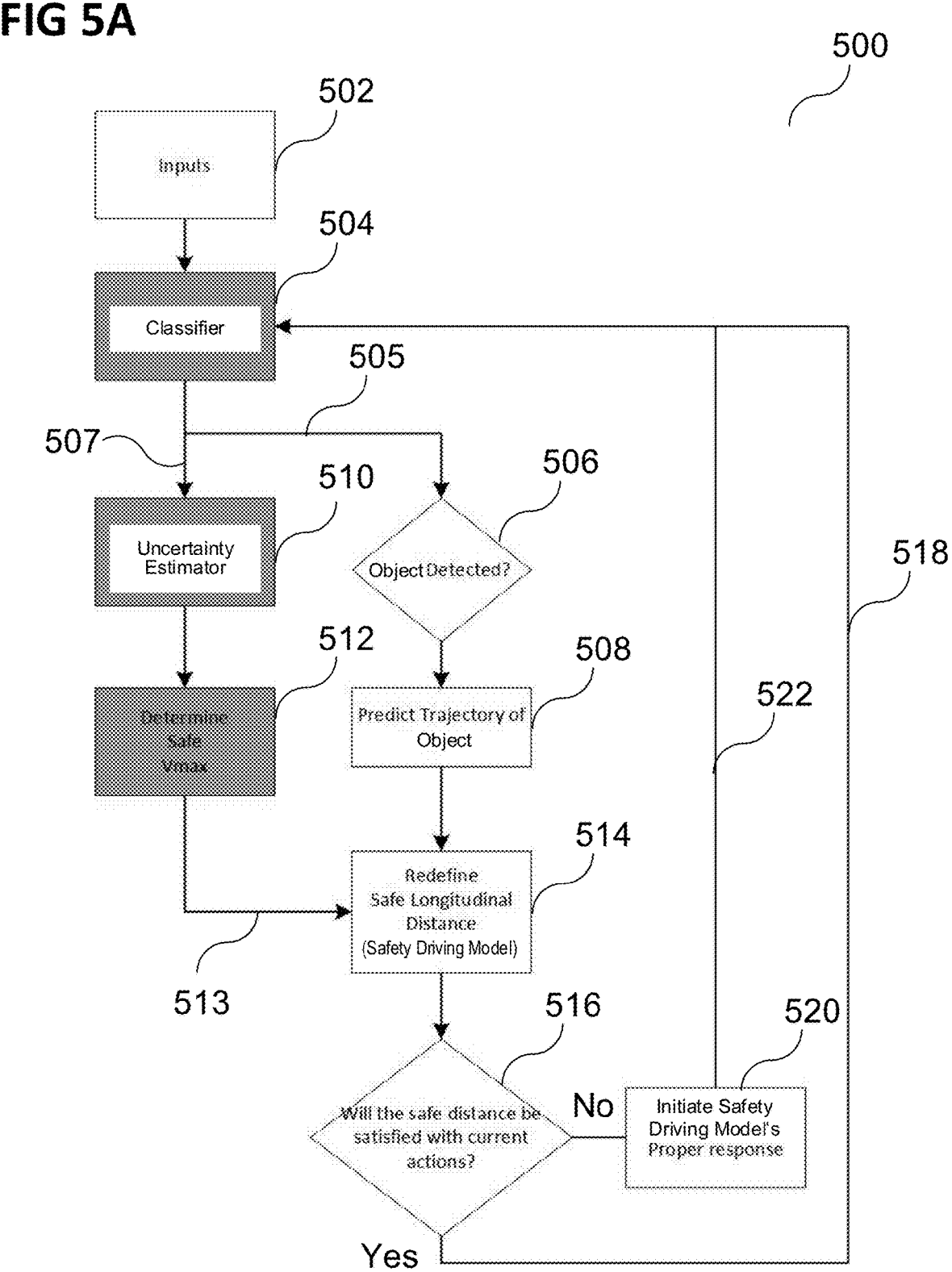
FIG. 5A shows a flow diagram illustrating a method to influence parameters of a safety driving model.
Figure 5B:
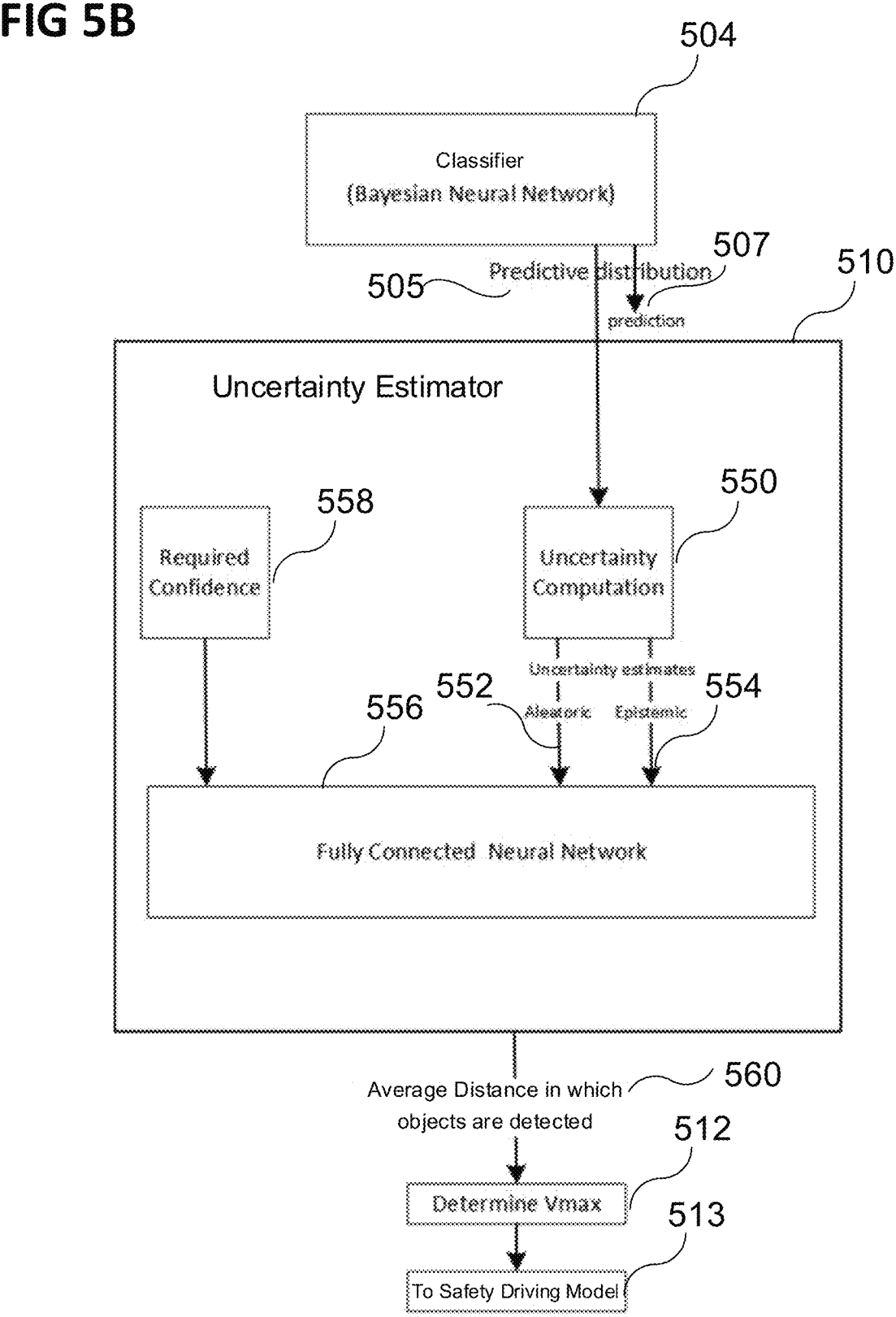
FIG. 5B shows a framework of an uncertainty estimator of FIG. 5A.

FIG. 5A shows a flow diagram illustrating a method 500 to influence parameters of a safety driving model according to various aspects of this disclosure for enabling safer operation of autonomous vehicles (AV) while being robust to, for example, at least one of unexpected sensor degradation or hazardous weather conditions, and FIG. 5B shows a framework of uncertainty estimator 510 shown in FIG. 5A. One or more processors of a safety system, e.g. the one or more processors 102 of safety system 200 included in vehicle 100 shown in FIG. 1, may implement the method 500. One or more memories of the safety system, e.g. the one or more memories 202 of safety system 200 shown in FIG. 2, may store (at least temporarily) any of the information (e.g., input or output data, model parameters, computation results, etc.) used or obtained in the method 500 (e.g., in or during any of the method steps).

Figure 6:
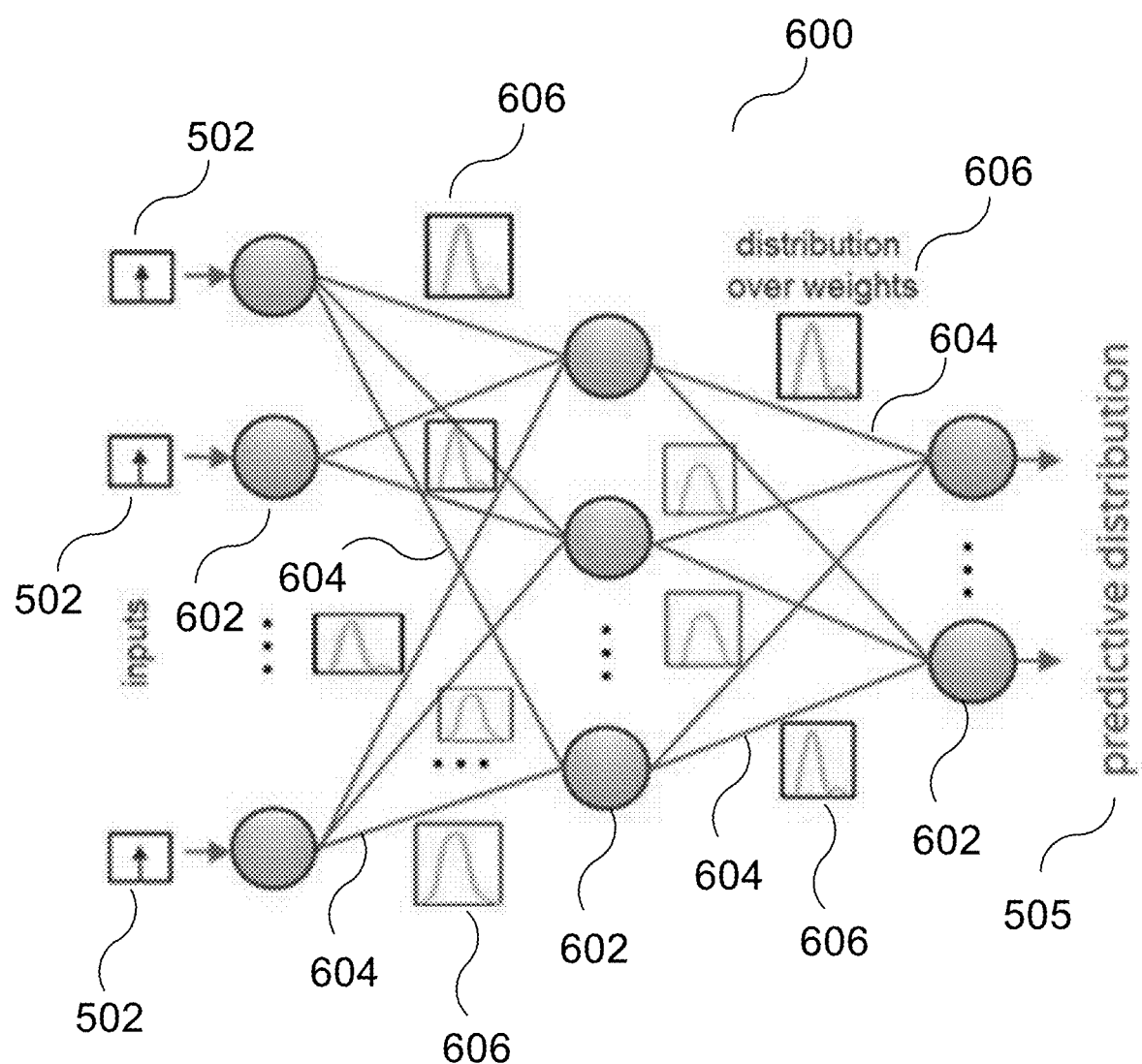
FIG. 6 shows a schematic representation of an exemplary Bayesian neural network (BNN)

The method 500 may include entering image data (e.g., obtained by the one or more image acquisition devices 104 of the safety system 200 of the vehicle 100, e.g. camera feed by one or more cameras), e.g., pixelwise, as inputs 502 into a classifier 504, which may be or include a Bayesian neural network (BNN). FIG. 6 shows a schematic representation of an exemplary BNN 600 including nodes 602 arranged in layers (including an input layer, an output layer and one or more hidden layers between the input layer and the output layer) and connected via edges 604, and weights 606 associated with the outputs of each of the nodes 602 except the nodes 602 of the output layer. Each of the weights 606 may assume values from a (e.g., predefinable) distribution over weights. A further explanation of the BNN 600 will be given herein below.

The classifier 504 (e.g., BNN 600) may provide as output a predictive distribution 505, from which three output components may be obtained: (1) a prediction result 507 (e.g., classification of image data (e.g., of objects included in an image frame) in accordance with predeterminable classes), (2) aleatoric uncertainty estimates 552, and (3) epistemic uncertainty estimates 554, that is noise-based and model-based uncertainties associated with the prediction result 507. The uncertainty estimates may include uncertainty estimates for each pixel of the input image data.

An uncertainty estimator 510 may receive the predictive distribution 505 from the classifier 504 (e.g., BNN 600) as input, process the predictive distribution 505, and provide as a result the uncertainty estimates 552 and 554 (uncertainty computation 550).

The uncertainty estimator 510 may include a fully connected neural network 556, which receives as inputs the uncertainty estimates 552, 554 obtained in the uncertainty computation 550 and a required confidence level 558. The confidence level 558 may be predefined. As an example, the confidence level 558 may be at least 80%, e.g. at least 85%, e.g. at least 90%, e.g. at least 95%, e.g. at least 99%. The fully connected neural network 556 may determine an average distance 560 in which the classifier 504 (BNN) detects and correctly classifies objects, e.g. road users (e.g., pedestrians and cyclists), with the required confidence level 558. The average distance 560 may be different for different types (classes) of objects, different scenarios (driving situations), different weather conditions (sun, rain, fog, dust, frost, etc.) as explained above.

The method 500 may include determining (in 512) a maximum allowed velocity $v_{max}$ for the vehicle 100 from the average distance 560 and provide, in 513, the determined $v_{max}$ as parameter to the safety driving model. The maximum allowed $v_{max}$ may, for example, be a velocity that enables the vehicle 100 to come to a safe stop at a distance $d_{safe}$ from an object (e.g., road user), see e.g., FIG. 3. Thus, $v_{max}$ may also be referred to as "safe $v_{max}$". The method 500 may enter $v_{max}$ into the safety driving model, for example, to redefine a "safe longitudinal distance" parameter of the safety driving model in 514, as will be explained further below. The method 500 may include determining whether to give control to a human driver based the uncertainty estimates obtained in the uncertainty computation 550.

The method 500 may include determining (in 506) from the prediction result 505 of the classifier 504 (BNN) whether the classifier 504 has detected at least one object (e.g., a road user, e.g. a pedestrian or cyclist).

If the classifier 504 has detected at least one object, the method may, in 508, predict a trajectory of the at least one object. This may be done, for instance, by using an ABC (approximate Bayesian computation) method, which uses a generative model to generate possible trajectories toward different goals, with the aim of determining a probability distribution based on how consistent they are with the observations. The generative model can be, for instance, a trajectory planning algorithm or a neural network. Another approach may be to use one or more neural networks trained from observed data.

The method 500 may include, in 514, redefining (in other words, changing or updating) the parameter "safe longitudinal distance" of the safety driving model based on the maximum allowed velocity $v_{max}$ determined in 512, or based on the predicted trajectory (trajectories) determined in 508, or both. If the value of $v_{max}$ determined in 512 differs from a previously determined value of $v_{max}$ (for example, a value of $v_{max}$ determined in a previous iteration of the method), the method 500 may adjust the safe longitudinal distance of the safety driving model (e.g., the distance $d_{min}$ of equation (5) above), for example to become longer or shorter depending on the value of $v_{max}$.

The method 500 may include determining, in 516, whether current actions (e.g., current actions of the vehicle, e.g. current driving operations, e.g. current driving velocity, acceleration, deceleration, etc.) will satisfy the (redefined) safe longitudinal distance. If the answer is "Yes", the method may include, in 518, returning to the classifier 504 so as to receive new input 502, e.g. new image data, for processing. If the answer is "No", the method may include, in 520, initiating a proper response in accordance with the safety driving model (e.g., decelerate (brake), stop accelerating, etc.) and, in 522, returning to the classifier 504 so as to receive new input 502, e.g. new image data, for processing.

An aspect of the method explained herein above is thus to redefine one or more parameters (e.g., safe longitudinal distance) of a safety driving model based on uncertainty estimation results obtained from predictive distributions of a Bayesian neural network (BNN), e.g. Bayesian deep neural network (BDNN).

Uncertainty estimation in accordance with aspects of this disclosure may help to design safer, reliable and robust artificial intelligence (AI) systems. Capturing reliable uncertainty estimates in accordance with aspects of this disclosure may help to establish trust in the model's confidence for decision making. Conventional deep learning methods do not provide uncertainty estimates along with predictions. Conventional deep neural networks (DNN) are trained to obtain the maximum likelihood estimates of the network parameters while completely disregarding uncertainty in predictions. Capturing uncertainty estimates from DNN output in accordance with aspects of this disclosure may help to avoid overconfident decisions in scenarios when completely novel input data is fed that has not been observed by the model during training.

The following description explains aspects of a Bayesian neural network (BNN), such as network 600 shown in FIG. 6, in further detail.

Bayesian neural networks (BNN) offer a probabilistic interpretation of deep learning models by inferring distributions over the model parameters (weights).

Given training dataset D={x, y} with inputs x= {$x_1$, ..., $x_N$} and their corresponding outputs y={$y_1$, ..., $y_N$}, in parametric Bayesian settings it is a goal to infer a distribution over weights ω of a function y=$f^\omega$(x) that represents the structure of the neural network to generate outputs. A prior distribution p(ω) may be assigned over the space of model parameters (weights) that captures a prior belief as to which model parameters (weights) would have likely generated the outputs before observing any data. A probability distribution over the outputs given the inputs p(y|x,ω) may be defined as model likelihood, which is usually assumed to be a categorical distribution over neural network output in classification settings and a Gaussian distribution over neural network output in regression settings. Given the evidence data, prior distribution and model likelihood, it is then a goal to look for the posterior distribution over the space of parameters p(ω|D) with Bayesian inference as shown in equation (6) below. This distribution captures how likely the model parameters are, given the observed data:

$$p(\omega|D) = \frac{p(y|x, \omega)p(\omega)}{\int p(y|x, \omega)p(\omega)d\omega} \quad (6)$$

where
p(ω): weight prior
p(y|x,ω): model likelihood
p(ω|D): weight posterior

In other words, the posterior p(ω|D) captures the set of plausible model parameters, given the data D.

With the approximate posterior for model parameters inferred during Bayesian neural network training, it is possible to predict an output for a new data point by propagating over the model likelihood while drawing samples from the learned parameter posterior. Equation (7) below shows predictive distribution of output y* given new input x*.

$$p(y^*|x^*, D) = \int p(y^*|x^*, \omega)p(\omega|D)d\omega \approx \frac{1}{T}\sum_{i=1}^{T} p(y^*|x^*, \omega_i); \quad (7)$$

$$\omega_i \sim p(\omega|D)$$

FIG. 7 shows a method 700 of operating a safety system for a vehicle. The method 700 may include, in 702, controlling a vehicle to operate in accordance with a driving model including predefined driving model parameters, in 704, determining uncertainty data indicating uncertainty in one or more predictions from the driving model during the operation of the vehicle, in 706, changing or updating one or more of the driving model parameters to one or more changed or updated driving model parameters based on the determined uncertainty data, and, in 708, controlling the vehicle to operate in accordance with the driving model including the one or more changed or updated driving model parameters.

FIG. 8 shows a method 800 of operating a safety system for a vehicle. The method 800 may include, in 802, determining uncertainty data indicating uncertainty in one or more predictions from a driving model including predefined driving model parameters, during operation of a vehicle, in 804, changing or updating one or more of the driving model parameters to one or more changed or updated driving model parameters based on the determined uncertainty data, and, in 806, providing the one or more changed or updated driving model parameters to a control system of the vehicle for controlling the vehicle to operate in accordance with the driving model including the one or more changed or updated driving model parameters.

In the following, various aspects of this disclosure will be illustrated:

Example 1 is a safety system for a vehicle. The safety system may include one or more processors configured to control a vehicle to operate in accordance with a driving model including predefined driving model parameters, to determine uncertainty data indicating uncertainty in one or more predictions from the driving model during the operation of the vehicle, to change or update one or more of the driving model parameters to one or more changed or updated driving model parameters based on the determined uncertainty data, and to control the vehicle to operate in accordance with the driving model including the one or more changed or updated driving model parameters.

Example 2 is a safety system for a vehicle. The safety system may include one or more processors configured to determine uncertainty data indicating uncertainty in one or more predictions from a driving model including predefined driving model parameters, during operation of a vehicle, to change or update one or more of the driving model parameters to one or more changed or updated driving model parameters based on the determined uncertainty data; and to provide the one or more changed or updated driving model parameters to a control system of the vehicle for controlling the vehicle to operate in accordance with the driving model including the one or more changed or updated driving model parameters.

In Example 3, the subject matter of Example 1 or 2 can optionally include that the safety system further includes a memory coupled to the one or more processors and storing the driving model parameters.

In Example 4, the subject matter of any one of Examples 1 to 3 can optionally include that the one or more processors are configured to implement a safety driving model.

In Example 5, the subject matter of any one of Examples 1 to 4 can optionally include that the one or more changed or updated driving model parameters meet with a predefined safety criterion in accordance with the driving model.

In Example 6, the subject matter of any one of Examples 1 to 5 can optionally include that the one or more processors are configured to determine the uncertainty data using a trained system.

In Example 7, the subject matter of Example 6 can optionally include that the trained system includes a neural network.

In Example 8, the subject matter of Example 7 can optionally include that the neural network includes a Bayesian neural network (BNN).

In Example 9, the subject matter of Example 8 can optionally include that the Bayesian neural network includes a Bayesian deep neural network (BDNN).

In Example 10, the subject matter of Example 8 or 9 can optionally include that the driving model is further configured to determine the one or more predictions from a predictive distribution of the Bayesian neural network.

In Example 11, the subject matter of Example 8 or 9 can optionally include that the driving model is further configured to determine the uncertainty data from a predictive distribution of the Bayesian neural network.

In Example 12, the subject matter of Example 10 can optionally include that the driving model is further configured to determine the uncertainty data from the predictive distribution of the Bayesian neural network.

In Example 13, the subject matter of any one of Examples 6 to 12 can optionally include that the uncertainty data indicate uncertainty due to noise in input data of the trained system.

In Example 14, the subject matter of any one of Examples 6 to 13 can optionally include that the uncertainty data indicate uncertainty due to uncertainty in model parameters of the trained system.

In Example 15, the subject matter of any one of Examples 6 to 12 can optionally include that the uncertainty data indicate at least one of uncertainty due to noise in input data of the trained system or uncertainty due to uncertainty in model parameters of the trained system.

In Example 16, the subject matter of any one of Examples 6 to 12 can optionally include that the uncertainty data indicate at least one of aleatoric uncertainty or epistemic uncertainty.

In Example 17, the subject matter of any one of Examples 6 to 12 can optionally include that the uncertainty data indicate aleatoric uncertainty and epistemic uncertainty.

In Example 18, the subject matter of any one of Examples 1 to 17 can optionally include that the one or more predictions include one or more classifications of one or more objects included in image data.

In Example 19, the subject matter of Example 18 can optionally include that the one or more objects include one or more agents of a predefined classification class.

In Example 20, the subject matter of Example 18 or 19 can optionally include that the one or more objects include one or more users of a predefined classification class.

In Example 21, the subject matter of any one of Examples 18 to 20 can optionally include that the one or more objects include one or more road users.

In Example 22, the subject matter of any one of Examples 18 to 21 can optionally include that the one or more objects include at least one of: a pedestrian, a cyclist.

In Example 23, the subject matter of any one of Examples 18 to 22 can optionally include that the safety system further includes one or more image acquisition devices, e.g. one or more cameras, acquiring the image data.

In Example 24, the subject matter of any one of Examples 1 to 23 can optionally include that the driving model parameters include a maximum allowed velocity of the vehicle.

In Example 25, the subject matter of any one of Examples 1 to 24 can optionally include that the driving model parameters include a safe longitudinal distance for the vehicle.

In Example 26, the subject matter of any one of Examples 1 to 25 can optionally include that the one or more changed or updated driving model parameters include a maximum allowed velocity of the vehicle.

In Example 27, the subject matter of any one of Examples 1 to 26 can optionally include that the one or more changed or updated driving model parameters include a safe longitudinal distance for the vehicle.

In Example 28, the subject matter of any one of Examples 1 to 27 can optionally include that the one or more processors are further configured to determine an average distance at which objects, e.g. agents of a predefined class (e.g., pedestrians or cyclists), are detected with a predefined confidence level based on the uncertainty data, and to change or update the one or more driving model parameters to the one or more changed or updated driving model parameters based on the determined average distance.

In Example 29, the subject matter of Example 28 can optionally include that the one or more processors are configured to determine the average distance using a trained system.

In Example 30, the subject matter of Example 29 can optionally include that the trained system includes a neural network.

In Example 31, the subject matter of Example 30 can optionally include that the neural network includes a fully connected neural network.

In Example 32, the subject matter of Example 31 can optionally include that the fully connected neural network includes a fully connected recurrent neural network.

In Example 33, the subject matter of any one of Examples 1 to 32 can optionally include that the one or more processors are configured to initiate a proper response in accordance with a safety driving model based on the one or more changed or updated driving model parameters.

In Example 34, the subject matter of any one of Examples 1 to 33 can optionally include that the one or more processors are further configured to determine whether to give control to a human driver based on the determined uncertainty data.

Example 35 is a vehicle. The vehicle may include a safety system of any one of Examples 1 to 34.

Example 36 is a vehicle. The vehicle may include a control system configured to control the vehicle to operate in accordance with a driving model including predefined driving model parameters. The vehicle may further include a safety system of any one of Examples 2 to 34. The safety system may be coupled to the control system.

In Example 37, the subject matter of Example 36 can optionally include that the control system is further configured to receive the one or more changed or updated driving model parameters from the one or more processors of the safety system, and to control the vehicle to operate in accordance with the driving model including the one or more changed or updated driving model parameters.

Example 38 is a vehicle. The vehicle may include a control system configured to control the vehicle to operate in accordance with a driving model including predefined driving model parameters. The vehicle may further include a safety system including one or more processors. The one or more processors may be configured to determine uncertainty data indicating uncertainty in one or more predictions from the driving model during the operation of the vehicle, to change or update one or more of the driving model parameters to one or more changed or updated driving model parameters based on the determined uncertainty data, and to provide the one or more changed or updated driving model parameters to the control system for controlling the vehicle to operate in accordance with the driving model including the one or more changed or updated driving model parameters.

In Example 39, the subject matter of Example 38 can optionally include that the one or more processors are further configured to determine the uncertainty data using a Bayesian neural network.

Example 40 is a method of operating a safety system for a vehicle. The method may include controlling a vehicle to operate in accordance with a driving model including predefined driving model parameters, determining uncertainty data indicating uncertainty in one or more predictions from the driving model during the operation of the vehicle, changing or updating one or more of the driving model parameters to one or more changed or updated driving model parameters based on the determined uncertainty data, and controlling the vehicle to operate in accordance with the driving model including the one or more changed or updated driving model parameters.

Example 41 is a method of operating a safety system for a vehicle. The method may include determining uncertainty data indicating uncertainty in one or more predictions from a driving model during operation of a vehicle, changing or updating one or more of the driving model parameters to one or more changed or updated driving model parameters based on the determined uncertainty data, and providing the one or more changed or updated driving model parameters to a control system of the vehicle for controlling the vehicle to operate in accordance with the driving model including the one or more changed or updated driving model parameters.

Example 42 is a method of operating a safety system for a vehicle. The method may include determining uncertainty data indicating uncertainty in one or more predictions from a driving model during operation of a vehicle, changing or updating one or more of the driving model parameters to one or more changed or updated driving model parameters based on the determined uncertainty data, and providing the one or more changed or updated driving model parameters to a control system of the vehicle.

In Example 43, the subject matter of Example 42 can optionally include that the control system controls the vehicle to operate in accordance with the driving model including the one or more changed or updated driving model parameters.

In Example 44, the subject matter of any one of Examples 40 to 43 can optionally include that the method further includes storing the driving model parameters in a memory.

In Example 45, the subject matter of any one of Examples 40 to 44 can optionally include that the method further includes implementing a safety driving model.

In Example 46, the subject matter of any one of Examples 40 to 45 can optionally include that the one or more changed or updated driving model parameters meet with a predefined safety criterion in accordance with the driving model.

In Example 47, the subject matter of any one of Examples 40 to 46 can optionally include that determining the uncertainty data includes using a trained system.

In Example 48, the subject matter of Example 47 can optionally include that the trained system includes a neural network.

In Example 49, the subject matter of Example 48 can optionally include that the neural network includes a Bayesian neural network (BNN).

In Example 50, the subject matter of Example 49 can optionally include that the Bayesian neural network includes a Bayesian deep neural network (BDNN).

In Example 51, the subject matter of any one of Examples 40 to 46 can optionally include that determining the uncertainty data includes using a Bayesian neural network.

In Example 52, the subject matter of Example 50 or 51 can optionally include determining the one or more predictions from the driving model from a predictive distribution of the Bayesian neural network.

In Example 53, the subject matter of Example 50 or 51 can optionally include determining the uncertainty data from a predictive distribution of the Bayesian neural network.

In Example 54, the subject matter of Example 52 can optionally include determining the uncertainty data from the predictive distribution of the Bayesian neural network.

In Example 55, the subject matter of any one of Examples 47 to 54 can optionally include that the uncertainty data indicate uncertainty due to noise in input data of the trained system.

In Example 56, the subject matter of any one of Examples 47 to 55 can optionally include that the uncertainty data indicate uncertainty due to uncertainty in model parameters of the trained system.

In Example 57, the subject matter of any one of Examples 47 to 54 can optionally include that the uncertainty data indicate at least one of aleatoric uncertainty or epistemic uncertainty.

In Example 58, the subject matter of any one of Examples 47 to 54 can optionally include that the uncertainty data indicate aleatoric uncertainty and epistemic uncertainty.

In Example 59, the subject matter of any one of Examples 40 to 58 can optionally include that the one or more predictions include one or more classifications of one or more objects included in image data.

In Example 60, the subject matter of Example 59 can optionally include that the one or more objects include one or more agents of a predefined classification class.

In Example 61, the subject matter of Example 59 or 60 can optionally include that the one or more objects include one or more users of a predefined classification class.

In Example 62, the subject matter of any one of Examples 59 to 61 can optionally include that the one or more objects include one or more road users.

In Example 63, the subject matter of any one of Examples 59 to 62 can optionally include that the one or more objects include at least one of: a pedestrian, a cyclist.

In Example 64, the subject matter of any one of Examples 59 to 63 can optionally include acquiring the image data by one or more image acquisition devices, e.g. one or more cameras, of the safety system.

In Example 65, the subject matter of any one of Examples 40 to 64 can optionally include that the driving model parameters include a maximum allowed velocity of the vehicle.

In Example 66, the subject matter of any one of Examples 40 to 65 can optionally include that the driving model parameters include a safe longitudinal distance for the vehicle.

In Example 67, the subject matter of any one of Examples 40 to 66 can optionally include that the one or more changed or updated driving model parameters include a maximum allowed velocity of the vehicle.

In Example 68, the subject matter of any one of Examples 40 to 67 can optionally include that the one or more changed or updated driving model parameters include a safe longitudinal distance for the vehicle.

In Example 69, the subject matter of any one of Examples 40 to 68 can optionally include determining an average distance at which objects, e.g. road users, e.g. agents of a predefined class (e.g., pedestrians or cyclists), are detected with a predefined confidence level based on the uncertainty data, and changing or updating the one or more driving model parameters to the one or more changed or updated driving model parameters based on the determined average distance.

In Example 70, the subject matter of Example 69 can optionally include determining the average distance using a trained system.

In Example 71, the subject matter of Example 70 can optionally include that the trained system includes a neural network.

In Example 72, the subject matter of Example 71 can optionally include that the neural network includes a fully connected neural network.

In Example 73, the subject matter of Example 72 can optionally include that the fully connected neural network includes a fully connected recurrent neural network.

In Example 74, the subject matter of any one of Examples 40 to 73 can optionally include initiating a proper response in accordance with a safety driving model based on the one or more changed or updated driving model parameters.

In Example 75, the subject matter of any one of Examples 40 to 74 can optionally include determining whether to give control to a human driver based on the determined uncertainty data.

Example 76 is a safety system for a vehicle. The safety system may include a memory storing driving model parameters of a driving model, and one or more processors coupled to the memory and configured to determine uncertainty in predictions from a detection and classification system for detecting and classifying objects in image data, and to adjust one or more of the driving model parameters based on the determined uncertainty.

Example 77 is a safety system for a vehicle. The safety system may include one or more processors configured to control a vehicle to operate in accordance with a driving model including predefined driving model parameters, to classify image data to obtain classification data including classifications of one or more image sections of the image data, to determine uncertainty data indicating uncertainty in the classifications of the one or more image sections of the image data, to change or update one or more of the driving model parameters based on the determined uncertainty data; and to control the vehicle to operate in accordance with the driving model including the one or more changed or updated driving model parameters.

In Example 78, the subject matter of Example 79 can optionally include that the safety system further includes a memory coupled to the one or more processors and storing the driving model parameters.

In Example 79, the subject matter of Example 77 or 78 can optionally include that the safety system further includes one or more image acquisition devices configured to acquire the image data.

In Example 80, the subject matter of any one of Examples 77 to 79 can optionally include that the one or more processors are further configured to classify the image data and determine the uncertainty data by applying a Bayesian deep neural network to the image data.

Example 81 is a non-volatile computer-readable medium storing instructions which, when executed by one or more processors, make the one or more processors perform a method of operating a safety system for a vehicle of any one of Examples 40 to 75.

Example 82 is a safety system for a vehicle. The safety system may include means for determining uncertainty data indicating uncertainty in one or more predictions from a driving model including predefined driving model parameters, during operation of a vehicle, means for changing or updating one or more of the driving model parameters to one or more changed or updated driving model parameters based on the determined uncertainty data, and means for providing the one or more changed or updated driving model parameters to means for controlling the vehicle.

In Example 83, the subject matter of Example 82 may optionally include that the safety system further includes means for controlling the vehicle to operate in accordance with the driving model including the one or more changed or updated driving model parameters.

Example 84 is a safety system for a vehicle. The safety system may include means for controlling a vehicle to operate in accordance with a driving model including predefined driving model parameters, means for determining uncertainty data indicating uncertainty in one or more predictions from the driving model during the operation of the vehicle, means for changing or updating one or more of the driving model parameters to one or more changed or updated driving model parameters based on the determined uncertainty data, and means for controlling the vehicle to operate in accordance with the driving model including the one or more changed or updated driving model parameters.

In Example 85, the subject matter of any one of Examples 82 to 84 can optionally include that the safety system further includes means for storing the driving model parameters.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A safety system for a vehicle, the safety system comprising:
    one or more processors configured to determine uncertainty data indicating uncertainty in one or more predictions from a driving model including predefined driving model parameters, during operation of a vehicle;
    change or update one or more of the driving model parameters to one or more changed or updated driving model parameters based on the determined uncertainty data; and
    provide the one or more changed or updated driving model parameters to a control system of the vehicle for controlling the vehicle to operate in accordance with the driving model including the one or more changed or updated driving model parameters,
    wherein the one or more processors are further configured to determine an average distance at which objects are detected with a predefined confidence level based on the uncertainty data, and change or update the one or more driving model parameters to the one or more changed or updated driving model parameters based on the determined average distance, and
    wherein the one or more processors are configured to determine the average distance using a trained system,
    wherein the uncertainty data indicates aleatoric uncertainty and epistemic uncertainty.

2. The safety system of claim 1, further comprising: a memory coupled to the one or more processors and storing the driving model parameters of the driving model.

3. The safety system of claim 1, wherein the one or more processors are configured to implement a safety driving model.

4. The safety system of claim 1, wherein the one or more changed or updated driving model parameters meet with a predefined safety criterion in accordance with the driving model.

5. The safety system of claim 1, wherein the one or more processors are configured to determine the uncertainty data using a trained system.

6. The safety system of claim 5, wherein the trained system comprises a neural network.

7. The safety system of claim 6, wherein the neural network comprises a Bayesian neural network.

8. The safety system of claim 7, wherein the one or more processors are further configured to determine the uncertainty data from a predictive distribution of the Bayesian neural network.

9. The safety system of claim 5, wherein the uncertainty data indicate at least one of uncertainty due to noise in input data of the trained system or uncertainty due to uncertainty in model parameters of the trained system.

10. The safety system of claim 1, wherein the one or more predictions include one or more classifications of one or more objects included in image data.

11. The safety system of claim 1, wherein the one or more changed or updated driving model parameters comprise a maximum allowed velocity of the vehicle.

12. The safety system of claim 1, wherein the one or more changed or updated driving model parameters comprise a safe longitudinal distance for the vehicle.

13. The safety system of claim 1, wherein the trained system comprises a fully connected neural network.

14. The safety system of claim 13, wherein the one or more processors are further configured to determine whether to give control to a human driver based on the determined uncertainty data.

15. A method of operating a safety system for a vehicle, the method comprising:
    determining uncertainty data indicating uncertainty in one or more predictions from a driving model including predefined driving model parameters, during operation of a vehicle;
    determining an average distance at which objects are detected with a predefined confidence level based on the uncertainty data using a trained system;
    changing or updating one or more of the driving model parameters to one or more changed or updated driving model parameters based on the determined uncertainty data, comprising changing or updating the one or more driving model parameters to the one or more changed or updated driving model parameters based on the determined average distance;
    providing the one or more changed or updated driving model parameters to a control system of the vehicle for controlling the vehicle to operate in accordance with the driving model including the one or more changed or updated driving model parameters,
    wherein the uncertainty data indicates aleatoric uncertainty and epistemic uncertainty.

16. The method of claim 15, wherein determining the uncertainty data comprises using a Bayesian neural network.

17. A vehicle, comprising:
    a control system configured to control the vehicle to operate in accordance with a driving model including predefined driving model parameters;
    a safety system, comprising one or more processors configured to:
        determine uncertainty data indicating uncertainty in one or more predictions from the driving model during the operation of the vehicle;
        determine an average distance at which objects are detected with a predefined confidence level based on the uncertainty data using a trained system;
        change or update one or more of the driving model parameters to one or more changed or updated driving model parameters based on the determined uncertainty data comprising to change or update the one or more driving model parameters to the one or more changed or updated driving model parameters based on the determined average distance; and
        provide the one or more changed or updated driving model parameters to the control system for controlling the vehicle to operate in accordance with the driving model including the one or more changed or updated driving model parameters, wherein the uncertainty data indicates aleatoric uncertainty and epistemic uncertainty.

18. The vehicle of claim 17, wherein the one or more processors are further configured to determine the uncertainty data using a Bayesian neural network.

19. A safety system for a vehicle, the safety system comprising:
  one or more processors configured to determine uncertainty data indicating uncertainty in one or more predictions from a driving model including predefined driving model parameters, during operation of a vehicle;
  change or update one or more of the driving model parameters to one or more changed or updated driving model parameters based on the determined uncertainty data; and
provide the one or more changed or updated driving model parameters to a control system of the vehicle for controlling the vehicle to operate in accordance with the driving model including the one or more changed or updated driving model parameters,
  wherein the uncertainty data indicates aleatoric uncertainty and epistemic uncertainty.

* * * * *